Figure 1:
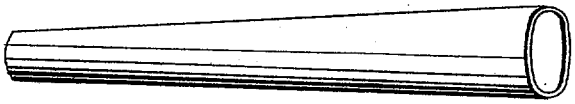
Figure 2:
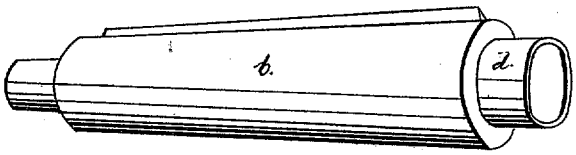

7601X

No Printed Specification Available

Butler & Rice,

Casting Carriage-Wheel Boxes.

Patented May 31, 1833.

N. PETERS, PHOTO-LITHOGRAPHER, WASHINGTON, D. C.

7601X [illegible] 13

May 31, 1833

William Butler & Edward B Rice

Letters Patent

The Schedule referred to in these Letters Patent and making part
of the same containing a description in the words of the said William
Butler and Edward B Rice themselves of their improvement
in the method of Casting Boxes for wheels of Carriages.

To all People to whom these presents shall come.
Be it known that We William Butler. Founder & Edward B
Rice Blacksmith both of Worcester in the County of Worcester &
commonwealth of Massachusetts have invented a new and useful
improvement in the method of casting Boxes for the wheels of carriages
by means of a hollow iron Core & that the following is a full and
exact description of the construction of the same as invented
or improved by us. Many attempts have been made to cast wheel
Boxes in such a way as to have the inside of the Box hard and smooth,
but thus far it is believed that all devices to accomplish so desirable
an object have utterly failed - The common method is to cast them
in sand which generally leaves the inside of the Box so rough & uneven
that before the axle tree is put in the Box is reamed or bored out
And if the iron be hard this method of making it smooth is atten-
ded with very considerable expense & to avoid this difficulty soft
iron is selected for the casting and the result is that the Boxes are
very soon worn out - The object of our improvement is so to cast
the Box that the inside surface of it shall be both hard and smooth.
Instead of making the core which forms the opening whole thro
the Box for the axle tree of sand we make use of an iron
tube - The tube may be made of iron or any composition of metals that
will not melt when the melted iron is poured around it. The tube is
large or small according to the size of the box & conical. The one we
have made is of thick sheet iron and the outward surface made smooth

7601X and polished by being turned in a lathe. This tube is placed in the mould
ing Box and the pattern put over it and the sand is then adjusted [illegible]
the mould as in the common method the pattern is then carefully
withdrawn leaving the hollow iron core in its place and the metal poured in.
We make use of the tube because when the metal is poured upon it, it
becomes greatly heated and expands & being hollow the air is permitted to
pass freely through it which cools it quicker than the box itself or metal
becomes cool. and in this way shrinks or contracts faster than the box so
that the tube or core when the box is cooled will easily drop out.–
If the core were of solid iron it would have received so much heat from
the contact with the melted metal that it would have retained the heat lon-
ger than the box and the consequence would be that that the box by its
more rapid contraction would either burst or adhere so closely to the core
that they could not be separated.– It is believed a well ascertained
fact that melted iron when poured upon cold iron becomes much harder
than when poured upon wood or sand. and as the core we make use of
is of iron and made almost perfectly smooth. the inside of the box
cast around is very hard and with an even and smooth surface
All we claim as our invention or improvement is the hollow iron core
for casting the boxes of the wheels of carriages Witnesses
Josiah C Young
Christopher Collumbus Baldwin William Butler
Edward B Rice (Dr in port-folio) 650 [illegible]

E.K.
Af/V.